UNITED STATES PATENT OFFICE.

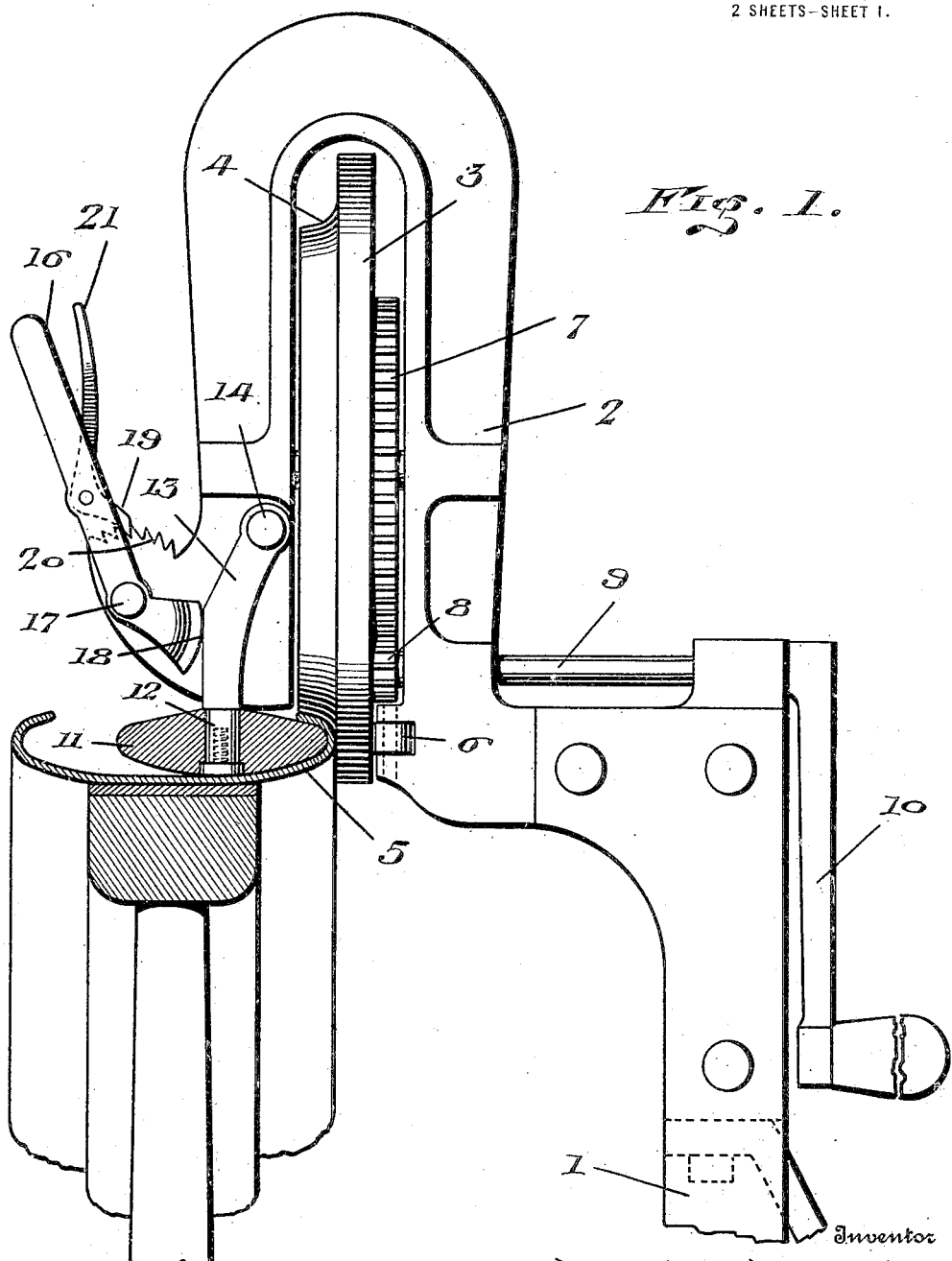

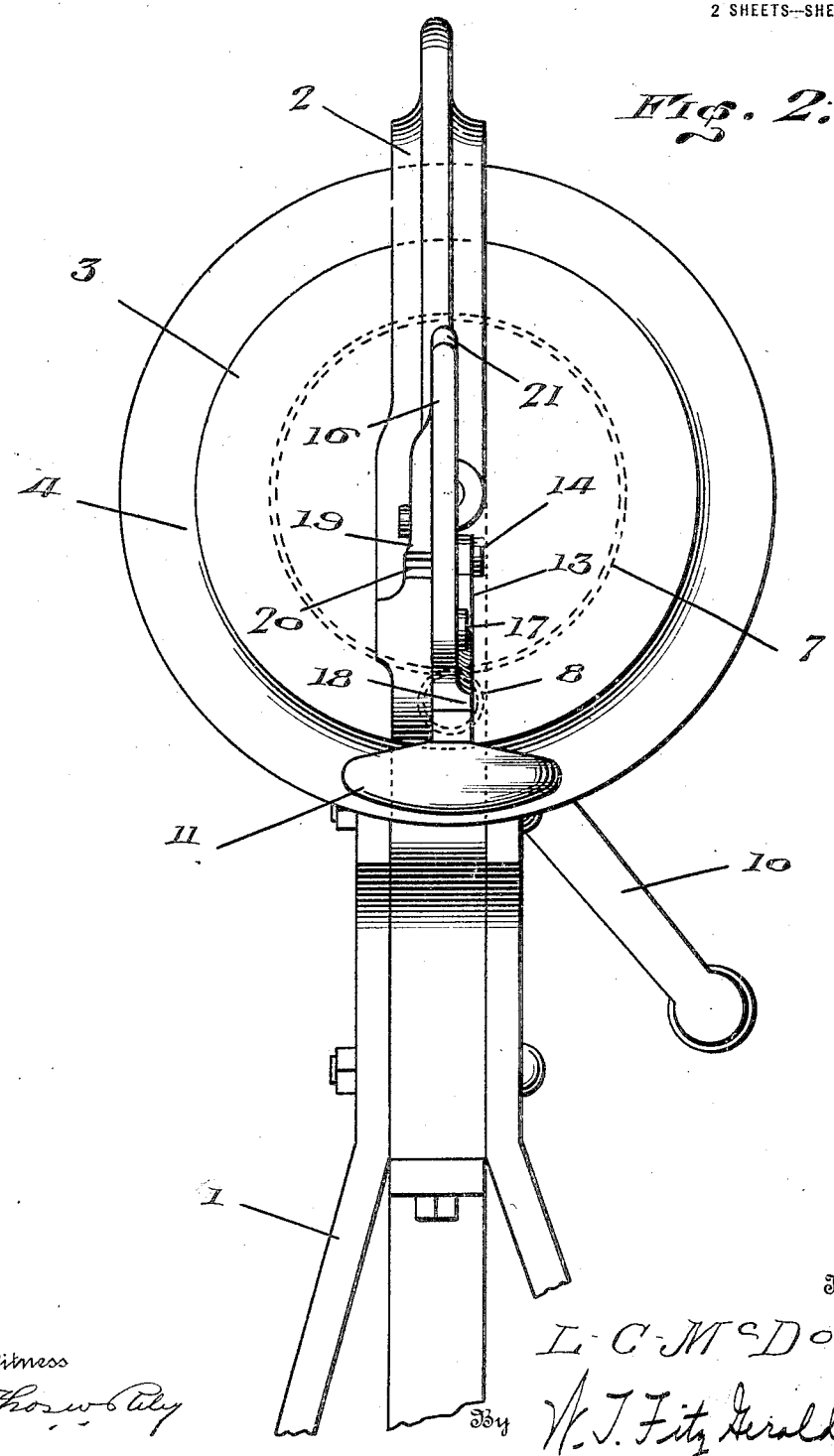

LEWIS CASCO McDONALD, OF PAGE, NEBRASKA.

RIM-REPAIRING MACHINE.

1,377,845.   Specification of Letters Patent.   Patented May 10, 1921.

Application filed May 15, 1919. Serial No. 297,275.

*To all whom it may concern:*

Be it known that I, LEWIS C. McDONALD, a citizen of the United States, residing at Page, in the county of Holt and State of Nebraska, have invented certain new and useful Improvements in Rim-Repairing Machines; and I do hereby declare the following to be a full, clear, and exact description of the invention, such as will enable others skilled in the art to which it appertains to make and use the same.

This invention relates to a rim repairing machine for repairing the rims of automobile wheels, and aims to provide a novel and improved machine of that character constructed and operable for rolling out the battered and dented wheel rims for pneumatic tires.

The rims of automobile wheels often become battered and dented, or bent out of shape, due to running the wheel on the rim, as when the tire has been removed due to a puncture or blowout, and the rims also become marred due to other causes, as when the wheel is handled or misused in taking off or putting on tires. A battered or dented rim results in the tire casing being cut or chafed, as well as permitting sand, water and other foreign matter to lodge and accumulate within the rim, thereby injuring the tire casing. This machine is designed for repairing the rim whereby to remove the dents, and restore the rim to original shape, as well as cleaning out the rim, so as to increase the life of the tire casing, in a simple yet efficient manner.

A still further object is the provision of such a machine so constructed that a wheel rim can be readily applied thereto, and the machine then operated for simultaneously rolling out the rim and turning the rim so as to smooth out the dents completely around same.

Another object is the provision of a rim repairing machine embodying wheels or rollers, one to fit the exterior and the other the interior of the rim, for rolling one edge portion of the rim into shape, said wheels being separable to be readily applied to and removed from the rim, and means being provided for clamping the wheels or rollers to the rim and rotating one wheel to roll the rim and turn the rim so as to pass between the rollers or wheels.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a side elevation of the machine, portions being broken away and portions being shown in section.

Fig. 2 is another side elevation looking at right angles to the line of view in Fig. 1.

Any suitable frame 1 is used for supporting the machine, and said frame has a U-shaped yoke or arch 2 in which a wheel or roller 3 is mounted for rotation with its axle carried by the side portions of the yoke 2. This wheel 3 is provided at its rim and one side with a rabbet 4 curved to fit the edge of the clencher rim 5 of a vehicle wheel, and forming a shoulder to bear against the bend of the rim. The clencher rim 5, as shown, has its edge portions bent outwardly and toward one another for receiving and holding the beads of the tire casing, as is well known. An anti-friction roller 6 is carried by the yoke 2 in back of the wheel 3 to contact with that face or side of the wheel opposite to the rabbet 4, and receive the pressure at the point of the wheel opposite to the point which contacts with the rim 5, thus preventing the pressure from binding or impairing the rotation of the wheel 3.

The wheel 3 is rotated by hand for rolling the rim, and for this purpose, the rear side of the wheel 3 has a gear 7 which meshes with a pinion 8 secured on a shaft 9 journaled through the yoke 2 and frame 1, and having a hand crank 10 for manually rotating the wheel 3.

A second wheel or roller 11 is constructed to fit within the rim, while the wheel 3 fits the exterior of the rim. This wheel 11 is of smaller diameter than the wheel 3 so as to pass between the edge portions of the rim, and the wheel 11 is at that side of the wheel 3 opposite to the roller 6, and is arranged at an angle with the wheel 3 near the rim thereof. The wheel 11 is disposed at that end of the yoke 2 opposite to the frame 1, and that side of the wheel 11 opposite the yoke 2 is convexed and the edge or rim of the wheel 11 is rounded, so that said wheel will fit within the rim 5, as seen in Fig. 1, to conform to the shape thereof. The wheel 11 is of a diameter less than the distance between the edges of the rim, and when said wheel is moved into place it can readily pass between the edges of the rim to bring the rounded edge portion of the wheel into the inner annular groove of the corresponding edge portion of the rim, as seen in Fig. 1, with the axis of said wheel substantially radial of the rim between the edges thereof, and that side or face of the wheel 11 adjacent to the rim is curved or convexed to fit the corresponding side portion of the periphery of the rim. The wheel 11 forces the inward dents outward while the wheel 3 moves the outward dents inward, thus restoring the shape of the rim, the edge portion of which is rolled between the two wheels.

The wheel 11 is carried by an arm 13 which has a pintle 12 on which the wheel 11 is mounted for rotation, and the arm 13 is pivoted, as at 14, to the yoke 2 thereby permitting the wheel 11 to be swung with said arm toward and away from the wheel. This permits the wheels to be separated in applying or removing the rim, and when the edge portion of the rim is moved into place against the wheel 3, the wheel 11 can be swung into the rim.

In order to clamp the rim between the wheels 3 and 11, supplying pressure to the arm 15 a lever 16 is pivoted, as at 17, to the yoke, and has a cam 18 bearing against the arm 13, in order that when the lever 16 is swung away from the yoke 2, the cam 18 will force the roller 11 with considerable pressure toward the wheel 3 at substantially right angles therewith, thus clamping the edge portion of the rim tightly between the edge or rim of the wheel 11 and the rabbet 4 of the wheel 3. A pawl 19 carried by the lever 16 engaging a segment 20 on the yoke 2 for holding the lever 16, and the pawl 19 has a finger piece 21 to release the pawl when it is desired to release the wheel 11, so that it can be swung away from the lever 3 to remove the rim.

In operation, when the rim has been applied between the wheels 3 and 11, and the lever 16 swung to clamp the edge portion of the wheel rim between the wheels, the crank 10 is rotated for rotating the wheel 3, thereby turning the rim between the two wheels, which will roll the edge portion of the rim into shape. The rotation of the wheel 3 will move the rim between the wheels, while the cam 18 will provide the pressure for clamping the rim between the two wheels so as to press the dents back into place, thereby restoring the shape of the rim. The outer edges of the rims of an automobile can be operated on without removing the wheels from the machine, by simply removing the tires and applying the rims in succession to the machine, jacking the wheels up when applied to the machine. By releasing the pawl 19 and swinging the lever 16 back against the yoke 2, this releases the arm 13 so that the wheel 11 can be swung out of the way for either applying or removing the rim. The wheel 11 will also clean out dirt which has accumulated within the rim due to the rolling motion of the wheel 11 within the edge portion of the rim as the rim is turned by the rotation of the wheel 3.

Having thus described the invention, what is claimed as new is:—

1. A machine for repairing clencher rims of vehicle wheels having their edge portions bent outwardly and toward one another, comprising a wheel formed to fit one of said edge portions of the rim on the exterior thereof, a second wheel of a diameter less than the distance between the edges of said rim and having its edge portion arranged to fit within said edge portion of the rim, means for mounting the wheels and providing for the movement of the second wheel to and from a position between the edge portions of the rim to move into and out of the rim, and for supporting the second wheel in operative position with its axis substantially radial of the rim between the edges thereof, and means for applying pressure to said wheels.

2. A machine for repairing clencher rims of vehicle wheels having their edge portions bent outwardly and toward one another, comprising a frame, a wheel carried by the frame and formed to fit one of said edge portions of the rim on the exterior thereof, a second wheel of a diameter less than the distance between the edges of said rim and having its edge portion rounded to fit within said edge portion of the rim, one side of the second wheel being convexed to fit the periphery of the rim, means for supporting the second wheel from the frame for movement to and from a position between the edge portions of the rim to move into and out of the rim, and for supporting the second wheel in operative position with its axis substantially radial of the rim between the edges thereof, and means for supplying pressure to said second wheel.

3. A machine for repairing clencher rims of vehicle wheels having their edge portions bent outwardly and toward one another, comprising a frame, a wheel carried by said frame shaped to fit one edge portion of the rim on the exterior thereof, a second wheel of a diameter less than the distance between the edges of the rim having its edge formed to fit said edge portion of the rim on the interior thereof, an arm pivotally connected to the frame on which the second wheel is rotatable and arranged for swinging the second wheel with the arm into and out of operative position, and for supporting the second wheel in operative position with its axis substantially radial of the rim between the edges thereof, and means between the frame and said arm for swinging said arm toward the first named wheel for applying pressure.

4. A machine for repairing the clencher rims of vehicle wheels, comprising a frame having a yoke, a wheel mounted for rotation in said yoke and having a rabbet at one side to fit the exterior of one of the bends of a clencher rim, an arm pivoted to the yoke at one side of said wheel, a second wheel mounted for rotation on said arm and movable therewith to a position between the opposite bends of the rim, the periphery of the second wheel being shaped to fit within the first named bend, a roller carried by the yoke at the opposite side of the first named wheel against which said wheel bears opposite to the second wheel, and means carried by the yoke for forcibly moving said arm toward the first named wheel.

In testimony whereof I have signed my name to this specification.

LEWIS CASCO McDONALD.

Witnesses:
E. T. DEMING,
W. S. McDONALD.